Patented Nov. 28, 1944

2,363,618

UNITED STATES PATENT OFFICE 2,363,618

BUTADIENE POLYMER COMPOSITION

Joseph C. Patrick, Morrisville, Pa., assignor to Thiokol Corporation, Trenton, N. J., a corporation of Delaware No Drawing. Application October 16, 1941, Serial No. 415,216

3 Claims. (Cl. 260—36)

This invention relates to synthetic rubber compositions.

Synthetic rubber compositions of the butadiene type are now well known. The more common commercial examples of these rubbers are copolymers of butadiene with some other substance as, for example, acrylic nitrile, styrene, etc. These polymers have certain disadvantages which impede their more general application, among which disadvantages there are two to which special attention is given in accordance with the present invention. One of these is the lack of sufficient tackiness or "tack." This property is very important. Natural rubber possesses it in high degree and consequently a great many commercial operations are geared to dependence on this quality for economical operation as, for example, the manufacture of rubber footwear, automobile tires and the like. Such articles can, of course, be made from the synthetic polymers but at a sacrifice in economy due to lack of the necessary tack to permit the multiferous manipulations to which such products are subjected in the course of their manufacture. Another disadvantage is the inability of such compounds to preserve their characteristic properties at low temperatures.

Numerous attempts have been made to supply these deficiencies by means of plasticizers and a large number of plasticizers have been suggested. A good plasticizer must, however, answer rather severe requirements. It must not only possess adequate plasticizing properties but it must also have the ability to contribute the necessary tackiness while at the same time imparting to the compound the ability to withstand low temperatures without loss of desirable properties. It must also boil sufficiently high so as not to become volatilized in the operations to which the compound is subjected. It must not be toxic and must not impart a disagreeable odor.

It is an object of the present invention to discover a plasticizer which when incorporated with a synthetic rubber of the butadiene type will and of itself contribute the above mentioned desired properties and meet the specified requirements.

In accordance with the present invention there are employed, in general, polyglycol halides and polyglycol esters and lower fatty acid esters of thiopolyglycols. The term "lower fatty acids" means formic acid, acetic acid, propionic acid and butyric acid.

By way of illustration the following specific example will be given:

One hundred parts by weight of a copolymer of butadiene and acrylic nitrile are masticated on a rubber mixing roll with twenty parts by weight of thiodiglycol diacetate. Softening takes place with extreme rapidity and the tough, rigid butadiene polymer becomes soft and readily workable, and what is more important, the dry-feeling surface of the synthetic rubber takes on a stickiness or tackiness which is of such great value in rubber fabrication. Suitable compounding ingredients are then added in a manner well known to the art, and the addition of these compounding ingredients is very greatly facilitated by the properties developed in the synthetic rubber by incorporation with the plasticizer. The compound is then cured in any suitable manner.

It is found to possess properties among which may be mentioned greatly enhanced resistance to low temperatures. For example, a compound softened in the above manner will readily withstand temperatures as low as —40° F. without undue stiffening or any tendency toward embrittlement, whereas the compound made from the butadiene polymer without the addition of the softening agent would withstand temperatures only very little below zero F. There is no serious impairment on aging of the properties developed by this plasticizer, nor is there any deleterious effect upon the physical properties of the butadiene polymer resulting from the use of the plasticizer. Moreover, the latter does not impart any toxicity or disagreeable odor. It is further to be noted that there is no "blooming" of this plasticizer to the surface with the consequent formation of either a powdery, unsightly surface or of a greasy-feeling surface such as so frequently follows the incorporation of plasticizers.

Instead of the particular synthetic rubber above mentioned in the example, synthetic rubbers, generally, of the butadiene type may be used as, for example, polymers of chloro 2, butadiene 1,3, polymers of butadiene as such and copolymers of butadiene with various copolymeric adjutants, e. g., acrylic nitrile, styrene, etc. No extensive description of such synthetic butadiene polymers is necessary because they are known in the art. Instead of the diacetate of thiodiglycol, lower fatty acid esters of thiopolyglycols in general may be employed, among which the following specific representatives (by way of illustration but not limitation) may be listed:

Thiodiglycol formate, acetate, etc.
Thiotriglycol formate, acetate, etc.
Thiotetraglycol formate, acetate, etc.
Thiopentaglycol formate, acetate, etc.
Thiohexaglycol formate, acetate, etc.

The particular proportion of plasticizer may, of course, be varied as desired.

I claim:

1. A composition of matter comprising a lower fatty acid ester of a polythioglycol incorporated with a copolymer of butadiene and a substance selected from the group consisting of acrylic nitrile and styrene, the amount of said polythioglycol being sufficient to produce tackiness in said composition.

2. A composition of matter comprising a lower fatty acid ester of thiodiglycol incorporated with a copolymer of butadiene and a substance selected from the group consisting of acrylic nitrile and styrene, the amount of said thiodiglycol being sufficient to produce tackiness in said composition.

3. A composition of matter comprising thiodiglycol diacetate incorporated with a copolymer of butadiene and a substance selected from the group consisting of acrylic nitrile and styrene, the amount of said thiodiglycol diacetate being sufficient to produce tackiness in said composition.

JOSEPH C. PATRICK.